(12) United States Patent
Unger et al.

(10) Patent No.: US 11,129,475 B2
(45) Date of Patent: Sep. 28, 2021

(54) BASE TO SWITCH AN APPARATUS BETWEEN SLIDABLE AND NON-SLIDABLE STATES

(71) Applicant: DIONEX SOFTRON GMBH, Germering (DE)

(72) Inventors: Andreas Hermann Josef Unger, Garching (DE); Matthias Westermayer, Germering (DE)

(73) Assignee: DIONEX SOFTRON GMBH, Germering (DE)

( * ) Notice: Subject to any disclaimer, the term of this patent is extended or adjusted under 35 U.S.C. 154(b) by 178 days.

(21) Appl. No.: 15/831,670

(22) Filed: Dec. 5, 2017

(65) Prior Publication Data
US 2018/0156383 A1 Jun. 7, 2018

(30) Foreign Application Priority Data

Dec. 5, 2016 (DE) ........................ 10 2016 123457.5

(51) Int. Cl.
*A47B 91/00* (2006.01)
*F16M 13/02* (2006.01)
(Continued)

(52) U.S. Cl.
CPC ............ *A47B 91/00* (2013.01); *B23Q 1/0054* (2013.01); *F16M 7/00* (2013.01); *F16M 9/00* (2013.01);
(Continued)

(58) Field of Classification Search
CPC ......... A47B 91/02; A47B 91/04; A47B 91/06; A47B 91/12; A47B 2220/0022;
(Continued)

(56) References Cited

U.S. PATENT DOCUMENTS 2,360,874 A * 10/1944 Herold .................... B62B 5/049
  188/5
2,712,366 A *  7/1955 Skupas ............... B60B 33/0089
  188/21
(Continued)

FOREIGN PATENT DOCUMENTS

JP         2014117423 A       6/2014

OTHER PUBLICATIONS

Southco; PT-Tubular Key Cam Lock; Aug. 16, 2013; pp. 1-2; https://web.archive.org/web/20130816013625/https://www.southco.com/en-us/pt.*

(Continued)

*Primary Examiner* — Ingrid M Weinhold
(74) *Attorney, Agent, or Firm* — David A. Schell; Timothy James Ohara; Parag Shekher (57) ABSTRACT

An apparatus includes a base to switch the apparatus between slidable and non-slidable states, for example a laboratory analysis device, wherein the base is adapted to be located on a flat surface, the base comprising a bottom section adapted to contact the flat surface when the base is located on the flat surface, a movable section that is adapted to assume a retracted position and an extended position, wherein, in the retracted position, the movable section does not contact the flat surface when the base is located on the flat surface, and, in the extended position, the movable section contacts the flat surface when the base is located on the flat surface.

17 Claims, 4 Drawing Sheets

(51) Int. Cl.
  *B23Q 1/00* (2006.01)
  *F16M 7/00* (2006.01)
  *F16M 9/00* (2006.01)
  *D06F 39/12* (2006.01)

(52) U.S. Cl.
  CPC ......... *F16M 13/022* (2013.01); *D06F 39/125* (2013.01); *F16M 2200/027* (2013.01); *F16M 2200/08* (2013.01)

(58) Field of Classification Search
  CPC ...... A47B 2220/0027; A47B 2220/003; F16M 13/022; F16M 7/00; F16M 9/00; F16M 2200/027; F16M 2200/08; B65G 21/14; B60B 33/0089; B60B 33/0097; B62B 5/049; G06F 1/166; G06F 1/1667; D06F 39/125
  USPC ........ 248/346.06, 646–647, 509, 688, 188.9, 248/678, 615, 616; 188/5, 19; 280/79.11, 43.24, 33.994; 361/679.59
  See application file for complete search history.

(56) References Cited

U.S. PATENT DOCUMENTS

| | | | | |
|---|---|---|---|---|
| 2,847,092 A * | 8/1958 | Noyes | B62B 5/049 | 188/5 |
| 2,929,590 A * | 3/1960 | Thomas | A47B 21/00 | 248/129 |
| 2,964,327 A * | 12/1960 | Mohr | B25H 1/04 | 16/29 |
| 3,868,903 A * | 3/1975 | Montalbano | B30B 9/3017 | 100/100 |
| 3,878,573 A * | 4/1975 | Boudewyn | A61G 7/05 | 248/362 |
| 3,879,796 A * | 4/1975 | Whyte | A47B 91/02 | 16/33 |
| 3,994,505 A * | 11/1976 | Balha | B62B 3/1404 | 280/33.994 |
| 4,242,668 A * | 12/1980 | Herzog | B62B 3/1404 | 280/33.994 |
| 4,302,025 A * | 11/1981 | Waddell | B62B 5/049 | 188/19 |
| 4,883,282 A * | 11/1989 | Wolf | A61H 3/04 | 280/43.24 |
| 4,886,286 A * | 12/1989 | Whorton, III | B62B 3/006 | 280/47.35 |
| 5,431,254 A * | 7/1995 | Kramer | B62B 5/049 | 188/19 |
| 5,564,662 A * | 10/1996 | Lussi | A61G 13/10 | 248/188.2 |
| 5,738,520 A * | 4/1998 | Austin, Jr. | A61C 1/0038 | 137/625.23 |
| 6,611,973 B2 * | 9/2003 | Connell | A47C 17/86 | 16/35 R |
| 7,040,460 B1 * | 5/2006 | Sherrill | B25H 5/00 | 188/19 |
| 7,216,399 B2 * | 5/2007 | Webster | B62B 5/049 | 16/32 |
| 7,641,739 B2 * | 1/2010 | Matlack | B23K 20/1225 | 134/1 |
| 7,652,874 B2 * | 1/2010 | Loughnanae | G06F 3/0208 | 361/679.08 |
| 8,112,838 B2 * | 2/2012 | Matlack | B23K 20/26 | 15/104.02 |
| 8,681,492 B2 * | 3/2014 | Fan | F16B 47/00 | 248/205.5 |
| 8,914,925 B2 * | 12/2014 | Angott | A61B 5/702 | 128/845 |
| 8,921,096 B2 * | 12/2014 | Weissenbach | B01L 9/54 | 177/140 |
| 8,955,817 B2 * | 2/2015 | Nakata | B23Q 1/0054 | 16/44 |
| 9,833,068 B2 * | 12/2017 | Bernet | G01N 35/00 | |
| 2004/0069568 A1 * | 4/2004 | Wyse | E04G 1/24 | 182/118 |
| 2004/0139571 A1 * | 7/2004 | Chang | G06F 1/16 | 15/315 |
| 2007/0080030 A1 * | 4/2007 | Kramer | B60T 1/14 | 188/5 |
| 2008/0111329 A1 * | 5/2008 | Brown | B60D 1/00 | 280/33.997 |
| 2009/0101789 A1 * | 4/2009 | Chen | G06F 1/1616 | 248/687 |
| 2009/0230644 A1 * | 9/2009 | Stanley | B62B 3/10 | 280/43 |
| 2012/0212886 A1 * | 8/2012 | Chou | F16M 11/2014 | 361/679.01 |
| 2012/0287560 A1 * | 11/2012 | Fan | H05K 5/0204 | 361/679.01 |
| 2015/0069893 A1 * | 3/2015 | Bernet | G01N 35/00 | 312/249.8 |
| 2015/0198568 A1 * | 7/2015 | Haglund | G01N 30/56 | 248/161 |
| 2015/0203080 A1 * | 7/2015 | Modi | B60T 1/14 | 188/5 |
| 2017/0049225 A1 * | 2/2017 | Chau | A47B 37/00 | |
| 2017/0065355 A1 * | 3/2017 | Ross | A61B 34/30 | |
| 2017/0066461 A1 * | 3/2017 | Mcleod | B62B 5/049 | |
| 2018/0126344 A1 * | 5/2018 | Akerstrom | C12M 27/02 | |

OTHER PUBLICATIONS

Machine translation for Applicant Cited Foreign reference JP 2014117423; Yamaguchi Katsumi; published Jun. 30, 2014 (Year: 2014).*

* cited by examiner

BASE TO SWITCH AN APPARATUS BETWEEN SLIDABLE AND NON-SLIDABLE STATES

CROSS-REFERENCE TO RELATED APPLICATION

This application claims the priority benefit under 35 U.S.C. § 119 to German Patent Application No. DE 10 2016 123 457.5, filed on Dec. 5, 2016, the disclosure of which is incorporated herein by reference.

FIELD OF THE INVENTION

The present invention relates to the handling of heavy objects. While the invention will primarily be described with reference to laboratory analysis apparatuses, the skilled person will understand that the invention may also be applicable to other heavy devices or objects to be placed on a working bench or a counter, such as heavy tools (for example, box column drills), heavy domestic appliances (for example, fully automatic coffee machines), and to instruments and objects which stand on the floor, such as domestic appliances (for example, washing machines) and furniture (for example, wardrobes).

BACKGROUND

One example of handling heavy objects is the handling of heavy laboratory analysis apparatuses. Such an apparatus is typically placed on a working bench. When using such laboratory analysis apparatuses, different situations may occur. When an analysis is performed with such laboratory analysis apparatuses, it is desirable that they stand firmly on the working bench. One example of such a laboratory analysis apparatus is a high performance liquid chromatography (HPLC) apparatus. Another example may be a centrifuge. When such a centrifuge is used, it is desirable that is stands firmly while centrifugation is performed. Otherwise, the centrifuge may move on the working bench, deteriorating the results, potentially breaking other equipment on the working bench, potentially falling off the working bench and/or causing harm to the user. It will therefore be understood that there are situations where it is desirable to have the laboratory analysis apparatuses firmly and safely standing on the working bench. However, it may also be desirable to alter the location of a laboratory analysis apparatus on the working bench. For example, when the centrifuge has been used, it may be desirable to alter its location (e.g., to put it further away from the forward end of the working bench), thereby making room for other equipment or for cleaning the section of the working bench where the centrifuge was placed when operating. Thus, there may also be situations where it is desirable that the laboratory analysis apparatus can be moved easily on the working bench.

There are different potential solutions to the object of having an object standing firmly on the bench and moving it when desired. Typically, when considering this object, the feet of the apparatus housing are relevant. In general, a distinction is made between housing feet which adhere to the laboratory bench and those which slide on it. In this case, the material of the housing foot and the coefficient of friction thereof are relevant. The choice of materials with high coefficients of friction, typically elastomers, makes undesirable shifting of the laboratory analysis device on the laboratory bench more difficult (thus, such housing feet may provide a more stable stand). On the other hand, if manual shifting on the laboratory bench is to be made possible, materials with low coefficients of friction are typically chosen.

In the described application, because of the technical trends both properties of the housing foot are required: the laboratory analysis device should stand in a slip-resistant manner on the laboratory bench, but it should be possible for it to be shifted manually in a user-friendly manner. In addition to the above described scenario, the shifting on the laboratory bench may be desirable for various reasons, for example if: after the installation the laboratory analysis device is to be shifted to the ultimate location; further devices are set up alongside the laboratory analysis device and therefore rearrangement is necessary; unwanted liquid has run underneath the laboratory analysis device and must be wiped up for safety reasons; components and connections on the rear of the laboratory analysis device are to be replaced. That is, there are different scenarios where shifting or relocation of the laboratory device is desirable.

One problem with some existing devices is that they may not combine both properties (adhesion and slidability) with one another even by a corresponding choice of materials for the housing foot.

There are different known solutions to this problem.

A first solution is to find a compromise with respect to the coefficient of friction. That is, the coefficient of friction of the housing foot is chosen so that the laboratory analysis device is reasonably slip-resistant and at the same time can be shifted with greater effort. However, this may have the following disadvantages: It is not possible to achieve complete slip resistance, since the coefficient of friction must be reduced. It is also not possible to achieve substantial user-friendliness since, in addition to the substantial force which is necessary, stick-slip can occur during movement.

According to another solution, the housing feet are replaced by lockable fixed and swivel castors. That is, the laboratory analysis device stands on correspondingly dimensioned fixed and swivel castors which are provided with a lockable brake. However, this may have the following disadvantages: The fixed and swivel castors require space in terms of height and as a result in many cases it is difficult to reconcile them with design standards. Furthermore, the lockable brake is not easy for the user to reach, since it is located directly on the castor and thus also on the rear of the laboratory analysis device. In this case it is hardly possible to check the state of the brake (locked or unlocked) in a simple manner and thus to check the risk that the laboratory analysis device is in the unwanted slidable state. Also the laboratory analysis device with the brake locked is not completely slip-resistant; it can still carry out slight movements, since the swivel castors allow slight swiveling movements.

Another solution employs vertically adjustable housing feet. The housing feet can, for example, be slidable and extendable downwards manually by means of a thread or can be retracted into the underside of the laboratory analysis device, while the underside the underside of the laboratory analysis device can be adherent. That is, when the feet are retracted, the adherent underside of the laboratory device contacts the working bench (prohibiting movement) and when the feet are extended, sliding or movement of the laboratory analysis device is allowed. However, such a solution may have the following disadvantages: The housing foot must be retracted/extended against the weight of the laboratory analysis device. As a result, the user-friendliness diminishes if the weight is considerable. Moreover, the mechanism for vertical adjustment must be designed appropriately robustly and as a result is in many cases difficult to reconcile with design standards. Furthermore, the overall height of the laboratory analysis device changes with the retraction or extension of the housing feet, resulting for example in disadvantages in the mechanical connection to adjacent devices or in relation to design standards.

A still further solution employs the retrospective application of sliding or adherent underlays. That is, the friction between the laboratory bench and the laboratory analysis device is changed by manually pushing plates or films made of corresponding materials (adherent or slidable) underneath the device. However, this may have the following disadvantages: The laboratory analysis device must be lifted up manually for the plate or film to be pushed underneath it. If the device has a substantial weight this is often only possible with an additional tool and the user-friendliness is considerably impaired as a result. Moreover, due to the manual lifting the laboratory analysis device is moved into a distinctly inclined position so that, for example, parts which are set up or possibly also attached parts at the top must first of all be removed.

SUMMARY

In light of the above, it is an object of the present invention to overcome or at least alleviate the shortcomings and disadvantages of the prior art. In other words, it is an object of the present invention to enable the user to conveniently switch from a non-sliding state of an apparatus to a sliding state of the apparatus. The switching mechanism should be robust and fail safe.

According to a first embodiment, these objects are met by a base for an apparatus, wherein the base is adapted to be located on a flat surface, the base comprising a bottom section adapted to contact the flat surface when the base is located on the flat surface, and a movable section that is adapted to assume a retracted position and an extended position, wherein, in the retracted position, the movable section does not contact the flat surface when the base is located on the flat surface, and, in the extended position, the movable section contacts the flat surface when the base is located on the flat surface.

As will be understood, a user may set the movable section to the retracted position and to the extended position. Typically, the movable section may have a higher friction with the flat surface than the bottom section. Thus, the overall friction of the base is typically higher in the extended position of the movable section than it is in the retracted position. Thus, a user may switch the base from a "sliding state" (where the movable section is in the retracted position) to a "non-sliding state" (where the movable section is in the extended position). This may provide a convenient, user-friendly, robust and fail-safe mechanism for the user to switch the base between the two discussed states. The above discussed objects may thus be fulfilled by the present invention.

Put differently, the bottom section defines a plane and the movable section is adapted to assume different positions. In one position, which may be referred to as the retracted position, the movable section is further retracted than the plane defined by the bottom section. In such a configuration, when the base is placed on a flat surface, the movable section would not contact the flat surface. In another position, which may be referred to as the extended position, the movable section and particularly the end section is on level with the plane defined by the bottom section. Thus, when the base is placed on a flat surface, the movable section would contact the flat surface in such a position.

In still other words, the invention provides a sliding underside or bottom section of a base (e.g., of a laboratory analysis device). In addition, however, an adherent movable section (which may be realized as housing feet) are attached, which may be provided with a spring means. In this case the spring means presses the adherent housing foot away from the underside of the laboratory analysis device and against the laboratory bench. Thus the laboratory analysis device stands on the slidable underside, but is slip-resistant (=adherent state) due to the extended adherent housing feet. The adherent housing feet can be retracted into the underside by means of an operating element against the spring means, so that the laboratory analysis device only contacts the laboratory bench with the slidable underside (=slidable state). In this case the operating elements show the slidable state very clearly.

The movable section may comprise an end section adapted to contact the flat surface in the extended position.

The end section may have a coefficient of static friction with respect to a working bench having a melamine resin coating that is higher than the coefficient of static friction of the bottom section with respect to the working bench having a melamine resin coating.

It will be understood that thus, the extended position will be the non-sliding state, as the overall friction will be higher when the movable section is in the extended position.

When the term coefficient of static friction with respect to the working bench having a melamine resin coating is used herein, it should be understood that the respective coefficient of static friction between the material of the section of the apparatus and the described working bench having a melamine resin coating is meant. Furthermore, the coefficient of static friction should be understood to be the coefficient of static friction under standard conditions for ambient temperature and pressure (i.e., 298.15 K=25° C. and absolute pressure of 1 bar).

The coefficient of static friction of the bottom section with respect to a working bench having a melamine resin coating may be below 0.5, preferably below 0.3, further preferably below 0.15.

For example, this coefficient may be 0.1. That is, the coefficient typically is above 0.05.

The coefficient of static friction of the end section with respect to a working bench having a melamine resin coating may exceed 0.3, preferably exceeds 0.5, further preferably exceeds 0.7.

The end section may comprise an elastomer and in particular a thermoplastic elastomer.

The end section may have an area in the range of 100 to 10,000 $(mm)^2$, preferably 500 to 1,000 $(mm)^2$ adapted to contact the flat surface in the extended position.

For example, the area may be 800 $(mm)^2$. It will be understood that this is the area the end section of one movable section. In case more movable sections (such as two movable sections) are provided, each such section may have the above discussed area.

The base may further comprise a forcing element forcing the movable section to the extended position.

Thus, the extended position (typically corresponding to the non-sliding configuration) may be the default state, which may be a particularly fail safe configuration. Furthermore, by choice of the forcing element and the force it exerts, one may define the "stopping effect" the movable section has. It will be understood that the "stopping effect", i.e., the friction due to the movable section, depends on the force the forcing element exerts and the coefficient of static friction, as the static friction of this component is the product of the force of the forcing element and the coefficient of static friction.

The forcing element may be adapted to force the movable section to the extended position with a force in the range of 1 to 100 N, preferably 5 to 50 N, further preferably 7 to 12 N.

For example, the forcing element may be adapted to force the movable section to the extended section with a force of 9 N.

The forcing element may be a hydraulic forcing element.

The force may be controllable by the hydraulic forcing element.

The forcing element may be a biasing element.

The basing element may be a spring.

For example, the spring may be a spring with a spring constant of 5 N/mm and the spring may be displaced from the equilibrium position by 1.8 mm, such that the force provided by the spring is 9 N. However, the skilled person will understand that this is merely exemplary.

The spring may be an injected molded spring.

This may make the production of the spring very simple.

The movable section may be movable between the retracted and the extended position by means of a linear movement. Such a linear movement may be a particularly simple and fail safe embodiment of the movable section. Furthermore, when the movable section is adapted for such linear movement, the overall space required for the movable section and for its movement may be relatively low.

The base may comprise a base section of an actuation mechanism and the movable section may be adapted to switch from the extended position to the retracted position when actuated by the actuation mechanism.

Therein the movable section may be adapted to switch from the retracted position to the extended position when actuated by the actuation mechanism.

The actuation mechanism may be adapted to assume a first position when the movable section is in the retracted position, and a second position when the movable section is in the extended position, wherein the first and second positions of the actuation mechanism are different from one another and are visible to a user.

Thus, the actuation mechanism may visualize in which position the movable section is. This may enhance the fail safety of the base, as it is less likely that the movable section will be inadvertently set or left in the retracted position.

The actuation mechanism may further comprise a disconnectable section that is connectable to and disconnectable from the base.

The disconnectable section may be disconnectable from the base when the movable section is in the extended position, but not disconnectable from the base when the movable section is in the retracted position.

Again, this may increase the fail safety of the mechanism, as by this, it is clear to the user when the movable section is in the retracted position (and thus, the base is in the sliding state), as such a position and state are indicated by the disconnectable section of the actuation mechanism being connected to the base.

The base section of the actuation mechanism may be a lock.

The base may comprise a plurality of movable sections.

It will be understood that the features that have been described above with reference to one movable section may also be implemented in more than one movable section. That is, each of the movable sections is adapted to assume a retracted position and an extended position, wherein, in the retracted position, the movable section does not contact the flat surface when the base is located on the flat surface, and, in the extended position, the movable section contacts the flat surface when the base is located on the flat surface. Furthermore, each movable section may also have any of the features described above as an optional feature for the movable section.

The actuation mechanism may be adapted to actuate all of the plurality of movable sections simultaneously.

The base may comprise a plurality of base sections of actuation mechanisms, and each actuation mechanism may be adapted to switch one movable section from the extended position to the retracted position when actuated by the actuation mechanism.

The movable section may be adapted not to assume any position where the movable section extends beyond a plane defined by the bottom section.

The end section may be connected to the remainder of the movable section by injection molding.

The bottom section may have an area in the range of 300 to 30,000 $(mm)^2$ adapted to contact the flat surface, preferably 1,000 to 5,000 $(mm)^2$, further preferably 2,000 to 4,000 $(mm)^2$.

The bottom section may be made of a polyamide.

Furthermore, the present invention also relates to an apparatus comprising the base discussed above.

The apparatus may be a laboratory analysis device.

The apparatus may be a tool.

The apparatus may be a domestic appliance.

The apparatus may be a piece of furniture.

The apparatus may have a weight in the range of 10 to 1000 kg, preferably 30 to 150 kg, further preferably 80 to 120 kg.

The force may be smaller than the weight force of the apparatus. In particular, it will be understood that the overall force exerted by the movable section(s) is smaller than the weight force of the apparatus. For example, in case two movable sections are employed and the apparatus weights 100 kg, roughly corresponding to a weight force of 1,000 N, the overall force of the forcing elements typically is less than 1,000 N. For example, the overall force of the forcing elements may be 400 N and each of the two forcing elements may be adapted to exert a force of 200 N.

The invention also relates to a disconnectable section of an actuation mechanism, wherein the actuation mechanism is adapted to switch the movable section of the discussed base with the actuation mechanism from the extended position to the retracted position, wherein the disconnectable section is connectable to and disconnectable from the base.

The actuation mechanism may comprise any of the features recited above with respect to the actuation mechanism.

The disconnectable section may be a key.

The disconnectable section may have a signal color. Thus, the indication of the state the base assumes may be clearly visible to the user.

The present invention also relates to a system comprising the base discussed above and comprising the part of the actuation mechanism and the disconnectable section of the actuation mechanism discussed above.

Furthermore, the invention also relates to a system comprising the apparatus discussed above and comprising the part of the actuation mechanism and the disconnectable section of the actuation mechanism discussed above.

The disconnectable section may have a different color than the color of the base. Again, this may help to clearly indicate the state the base is in.

Further still, the present invention also relates to a use of the base discussed above, the apparatus discussed above or the system discussed above, wherein the use comprises locating the base on a flat surface, moving the base on the flat surface while the movable section is in the retracted position and does not contact the flat surface, and moving the movable section from the retracted to the extended position such that it contacts the flat surface.

The apparatus may be a laboratory analysis device and the flat surface may be a working bench.

The apparatus may also be a tool and the flat surface may be a working bench.

The apparatus may be a domestic appliance and the flat surface may be a kitchen counter.

The apparatus may be a domestic appliance and the flat surface may be a floor.

The coefficient of static friction of the apparatus when the movable section is in the extended position may exceed the coefficient of static friction of the apparatus when the movable section is in the retracted position.

More particularly, the coefficient of static friction of the apparatus when the movable section is in the extended position may be at least 1.5 times, preferably at least 2 times, further preferably at least 4 times the coefficient of static friction of the apparatus when the movable section is in the retracted position.

The flat surface may be made of a melamine resin.

That is, in general terms, the invention provides an alternation between adherent and slidable state of the base and/or the apparatus (which may be a laboratory analysis device). This alteration is done by means of a movable section (e.g., housing feet) that typically do not act counter to the weight of the laboratory analysis device. An adherent surface is pressed onto the laboratory bench, so that the laboratory analysis device can no longer be shifted by manual pulling or pressing or by vibration, etc. The force with which the surface is pressed onto the laboratory bench may be adapted to the coefficient of friction of the surface and the maximum shifting force.

Generally speaking, the present invention enables the apparatus (e.g. the laboratory analysis device) not only to stand in a slip-resistant manner on the laboratory bench, but if need be it is possible for it to be shifted manually in a user-friendly manner. Additionally, the following objects may also be met by the present invention:

The movable section(s) (which, in some embodiments may be housing feet) should be inconspicuous and should not have a negative influence on the design (esthetics) of the base and/or the apparatus (e.g., the laboratory analysis device). This may be attained by not allowing the movable section(s) to extend further than the plane defined by the bottom section. Thus, the overall height of the base and the apparatus are unaltered.

The movable or sliding state of the base and the apparatus should be clearly visible to the user, e.g. the laboratory analysis device should not be unintentionally movable on the laboratory bench, the slidable state should be unambiguously discernible. This may be attained, e.g., by including the discussed actuation mechanism.

Ideally, manual operating elements (e.g., of the actuation mechanism) may be user-friendly and easy to reach. This may differentiate the present invention and the discussed actuation mechanisms, e.g., from prior art castor mechanisms, where the actuation elements may be difficult to reach.

The mechanism may be robust and fail-safe in order to prevent unwanted shifting or slipping.

The overall height of the laboratory analysis device may remain unchanged during all user actions. Again, this may be attained by not allowing the movable section to extend further than the plane defined by the bottom section. For example, this may be attained by the choice of the force of the forcing element(s) not exceeding the weight force of the apparatus.

The production methods and the materials used may be adapted for cost-effective mass production.

To summarize, the invention and its discussed embodiments may have the following advantages over known approaches:

Conventional housing feet may be employed in order to meet design standards with regard to esthetics. The use of fixed and swivel castors can thus be avoided.

It is unambiguously discernible whether the base and thus the apparatus (e.g., the laboratory analysis device) is in the adherent or slidable state, since the operating elements unmistakably indicate the state.

The overall height of the apparatus (e.g., the laboratory analysis device) is not changed when alternating between the adherent and slidable states. In this way mechanical connections to adjacent devices are not hampered, and two devices mechanically connected to one another can be moved, for example, simultaneously on the laboratory bench.

No actions are necessary which act against the force of the weight of the apparatus (e.g., the laboratory analysis device). The actuation of the operating elements only has to be carried against the spring force and, moreover, is easy to achieve, resulting in a high degree of user-friendliness.

The user-friendliness is further increased considerably, since the base and the apparatus (e.g., the laboratory analysis device) can be transferred at any time without awkward intermediate steps into the slidable state.

The production costs may comparatively low since no mechanically robust parts such as ball bearings etc. have to be employed. The invention can be implemented completely with cost-effective injection moldings.

That is, the present invention meets its objects with regard to both user-friendliness (flexibility) and design standards (esthetics).

The present invention is also defined by the following numbered embodiments.

Below, base embodiments will be discussed. These "base embodiments" are identified by a "B" followed by a number. Whenever reference is herein made to base embodiments, those embodiments are meant.

B1. A base (100) for an apparatus (10), wherein the base (100) is adapted to be located on a flat surface (20), the base (100) comprising a bottom section (102) adapted to contact the flat surface (20) when the base (100) is located on the flat surface (20), a movable section (104) that is adapted to assume a retracted position and an extended position, wherein, in the retracted position, the movable section (104) does not contact the flat surface (20) when the base (100) is located on the flat surface (20), and, in the extended position, the movable section (104) contacts the flat surface (20) when the base (100) is located on the flat surface (20).

B2. The base (100) according to the preceding embodiment, wherein the movable section (104) comprises an end section (106) adapted to contact the flat surface (20) in the extended position.

B3. The base (100) according to the preceding embodiment, wherein the end section (106) has a coefficient of static friction with respect to a working bench having a melamine resin coating that is higher than the coefficient of static friction of the bottom section (104) with respect to the working bench having a melamine resin coating.

B4. The base (100) according to any of the preceding embodiments, wherein the coefficient of static friction of the bottom section (104) with respect to a working bench having a melamine resin coating is below 0.5, preferably below 0.3, further preferably below 0.15.

For example, this coefficient may be 0.1. That is, the coefficient typically is above 0.05.

B5. The base (100) according to any of the preceding embodiments with the features of embodiment B2, wherein the coefficient of static friction of the end section (106) with respect to a working bench having a melamine resin coating exceeds 0.3, preferably exceeds 0.5, further preferably exceeds 0.7.

B6. The base (100) according to any of the preceding embodiments with the features of embodiment B2, wherein the end section (106) comprises an elastomer.

B7. The base (100) according to any of the preceding embodiments with the feature of embodiment B2, wherein the end section (106) has an area in the range of 100 to 10,000 (mm)$^2$, preferably 500 to 1,000 (mm)$^2$ adapted to contact the flat surface (20) in the extended position.

For example, the area may be 800 (mm)$^2$. It will be understood that this is the area the end section of one movable section. In case more movable sections (such as two movable sections) are provided, each such section may have the above discussed area.

B8. The base (100) according to any of the preceding embodiments, wherein the base (100) further comprises a forcing element (108) forcing the movable section (104) to the extended position.

B9. The base (100) according to the preceding embodiment, wherein the forcing element (108) is adapted to force the movable section (104) to the extended position with a force (F1) in the range of 1 to 100 N, preferably 5 to 50 N, further preferably 7 to 12 N.

For example, the forcing element may be adapted to force the movable section to the extended section with a force of 9 N.

B10. The base (100) according to any of the 2 preceding embodiments, wherein the forcing element (108) is a hydraulic forcing element.

B11. The base according to the preceding embodiment and with the features of embodiment B9, wherein the force (F1) can be controlled by the hydraulic forcing element.

B12. The base (100) according to any of the embodiments B8 or B9, wherein the forcing element (108) is a biasing element (108).

B13. The base (100) according to the preceding embodiment, wherein the basing element (108) is a spring.

B14. The base (100) according to the preceding embodiment, wherein the spring is an injected molded spring.

B15. The base (100) according to any of the preceding embodiments, wherein the movable section (104) is movable between the retracted and the extended position by means of a linear movement.

B16. The base (100) according to any of the preceding embodiments, wherein the base (100) comprises a base section (103) of an actuation mechanism and wherein the movable section (104) is adapted to switch from the extended position to the retracted position when actuated by the actuation mechanism.

B17. The base (100) according to the preceding embodiment, wherein the movable section (104) is adapted to switch from the retracted position to the extended position when actuated by the actuation mechanism.

B18. The base (100) according to any of the preceding 2 embodiments, wherein the actuation mechanism is adapted to assume a first position when the movable section (104) is in the retracted position, and a second position when the movable section (104) is in the extended position, wherein the first and second positions of the actuation mechanism are different from one another and are visible to a user.

B19. The base (100) according to any of the preceding 3 embodiments, wherein the actuation mechanism further comprises a disconnectable section (202) that is connectable to and disconnectable from the base (100).

B20. The base (100) according to the preceding embodiment, wherein the disconnectable section (202) is disconnectable from the base (100) when the movable section (104) is in the extended position, but not disconnectable from the base (100) when the movable section (104) is in the retracted position.

B21. The base (100) according to any of the preceding 5 embodiments, wherein the base section of the actuation mechanism is a lock.

B22. The base (100) according to any of the preceding embodiments, wherein the base (100) comprises a plurality of movable sections (104).

B23. The base (100) according the preceding embodiment and with the features of embodiment B16, wherein the actuation mechanism is adapted to actuate all of the plurality of movable sections (104) simultaneously.

B24. The base (100) according to the penultimate embodiment and with the features of embodiment B16, wherein the base (100) comprises a plurality of base sections of actuation mechanisms, and wherein each actuation mechanism is adapted to switch one movable section (104) from the extended position to the retracted position when actuated by the actuation mechanism.

B25. The base (100) according to any of the preceding embodiments, wherein the movable section (104) is adapted not to assume any position where the movable section (104) extends beyond a plane defined by the bottom section (102).

B26. The base (100) according to any of the preceding embodiments with the features of embodiment B2, wherein the end section (106) is connected to the remainder of the movable section (104) by injection molding.

B27. The base (100) according to any of the preceding embodiments, wherein the bottom section (102) has an area in the range of 300 to 30.000 (mm)$^2$ adapted to contact the flat surface (20), preferably 1,000 to 5,000 (mm)$^2$, further preferably 2,000 to 4,000 (mm)$^2$.

B28. The base (100) according to any of the preceding embodiments, wherein the bottom section (102) is made of a polyamide.

Below, apparatus embodiments will be discussed. These "apparatus embodiments" are identified by an "A" followed by a number. Whenever reference is herein made to apparatus embodiments, those embodiments are meant.

A1. An apparatus (10) comprising the base of any of the preceding embodiments.

A2. The apparatus (10) according to the preceding embodiment, wherein the apparatus is a laboratory analysis device.

A3. The apparatus (10) according to embodiment A1, wherein the apparatus is a tool.

A4. The apparatus (10) according to embodiment A1, wherein the apparatus is a domestic appliance.

A5. The apparatus according to embodiment A1, wherein the apparatus is a piece of furniture.

A6. The apparatus (10) according to any of the preceding apparatus embodiments, wherein the apparatus has a weight in the range of 10 to 1000 kg, preferably 30 to 150 kg, further preferably 80 to 120 kg.

A7. The apparatus (10) according to any of the preceding apparatus embodiments with the features of embodiment B9, wherein the force (F1) is smaller than the weight force of the apparatus (10).

T1. A disconnectable section (202) of an actuation mechanism, wherein the actuation mechanism is adapted to switch the movable section (104) of the base (100) of any of the preceding embodiments with the features of embodiment 19 from the extended position to the retracted position, wherein the disconnectable section (202) is connectable to and disconnectable from the base (100).

T2. The disconnectable section (202) of an actuation mechanism according to the preceding embodiment, wherein the actuation mechanism comprises any of the features recited in embodiments B18 and B20.

T3. The disconnectable section (202) of an actuation mechanism according any of the preceding 2 embodiments, wherein the disconnectable section (202) is a key.

T4. The disconnectable section (202) of an actuation mechanism according any of the preceding 3 embodiments, wherein the disconnectable section (202) has a signal color.

Below, system embodiments will be discussed. These "system embodiments" are identified by an "S" followed by a number. Whenever reference is herein made to system embodiments, those embodiments are meant.

S1. A system comprising the base (100) according to any of the preceding base embodiments with the features of embodiment B19 and the disconnectable section (202) of an actuation mechanism according to any of the embodiments T1 to T4.

S2. A system comprising the apparatus according to any of the preceding apparatus embodiments with the features of embodiment B19, the disconnectable section (202) of an actuation mechanism according to any of the embodiments T1 to T4.

S3. The system according to any of the preceding system embodiments, wherein the disconnectable section (202) has a different color than the color of the base (100).

Below, use embodiments will be discussed. These "use embodiments" are identified by an "U" followed by a number. Whenever reference is herein made to use embodiments, those embodiments are meant.

U1. Use of the base (100) according to any of the preceding base embodiments, the apparatus (10) according to any of the preceding apparatus embodiments or the system according to any of the preceding system embodiments, wherein the use comprises locating the base (100) on a flat surface (20), moving the base (100) on the flat surface (20) while the movable section (104) is in the retracted position and does not contact the flat surface (20), and moving the movable section (104) from the retracted to the extended position such that it contacts the flat surface (20).

U2. Use according to the preceding embodiment, wherein the apparatus (10) is a laboratory analysis device and wherein the flat surface (20) is a working bench.

U3. Use according to the penultimate embodiment, wherein the apparatus (10) is a tool and the flat surface (20) is a working bench.

U4. Use according to embodiment U1, wherein the apparatus (10) is a domestic appliance and the flat surface (20) is a kitchen counter.

U5. Use according to embodiment U1, wherein the apparatus (10) is a domestic appliance and the flat surface (20) is a floor.

U6. Use according to any of the preceding use embodiments, wherein an apparatus (10) is used, wherein the coefficient of static friction of the apparatus (10) when the movable section (104) is in the extended position exceeds the coefficient of static friction of the apparatus (10) when the movable section is in the retracted position.

U7. Use according to the preceding embodiment, wherein the coefficient of static friction of the apparatus (10) when the movable section (104) is in the extended position is at least 1.5 times, preferably at least 2 times, further preferably at least 4 times the coefficient of static friction of the apparatus (10) when the movable section is in the retracted position.

U8. Use according to any of the preceding use embodiments, wherein the flat surface (20) is made of a melamine resin.

BRIEF DESCRIPTION OF DRAWINGS

The present invention will now be described with reference to particular embodiments that should exemplify, but not limit the scope of the present invention.

DETAILED DESCRIPTION OF EMBODIMENTS

Figure 1:
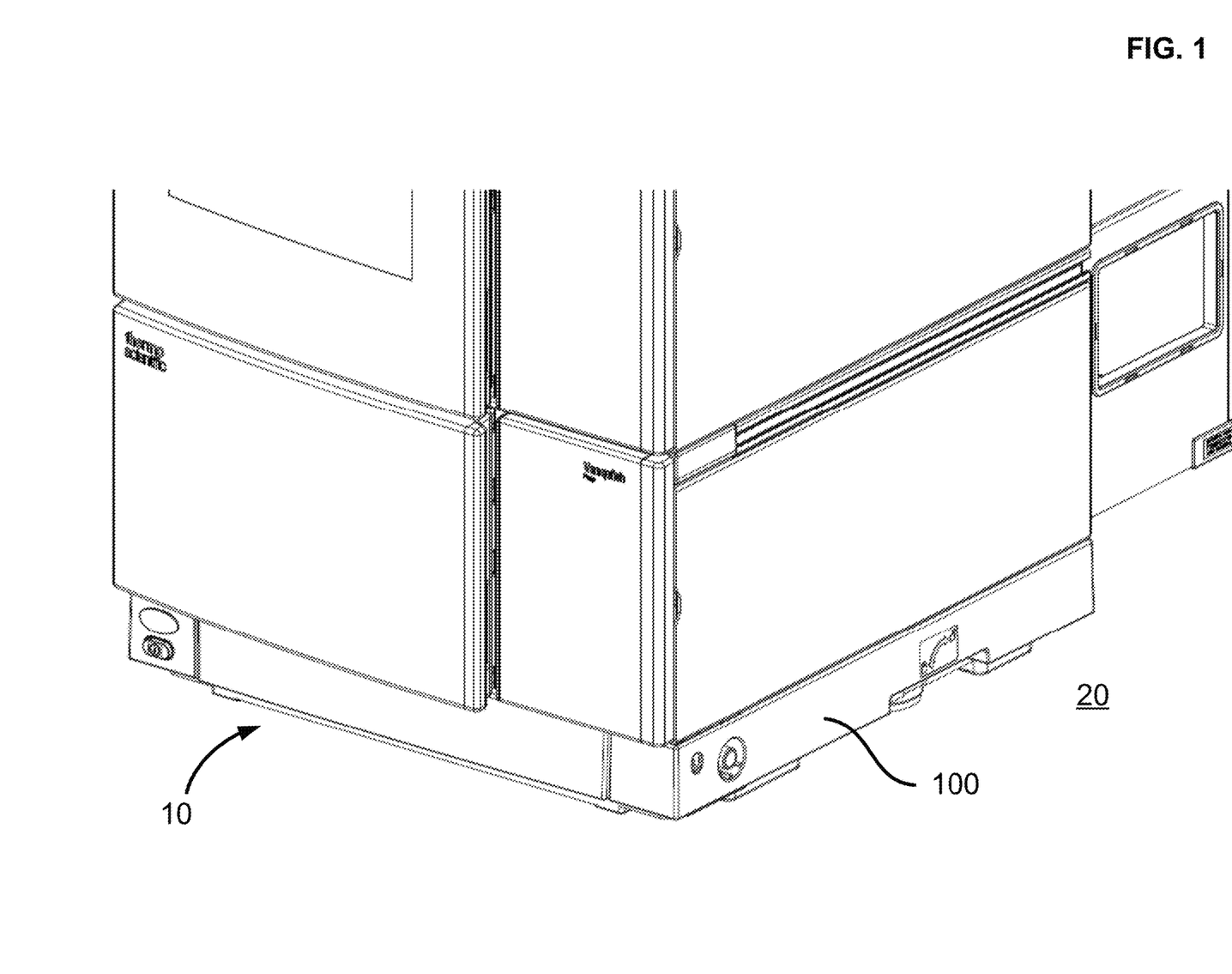
FIG. 1 depicts an apparatus of an embodiment of the present invention.

FIG. 1 depicts an apparatus 10 that is placed on a surface 20. In the present embodiment, the apparatus 10 may be a laboratory analysis apparatus or laboratory analysis device 10 and the surface 20 may be a working bench 20. However, this is merely exemplary and should not be understood to be limiting. FIG. 1 also depicts a base 100 of the apparatus 10. While in the present embodiment, the base 100 is a part of the apparatus 10, this is not a necessity. It may also be possible that the base 100 is a stand-alone device for retrofitting existing apparatuses and/or for placing other apparatuses into.

Figure 2:
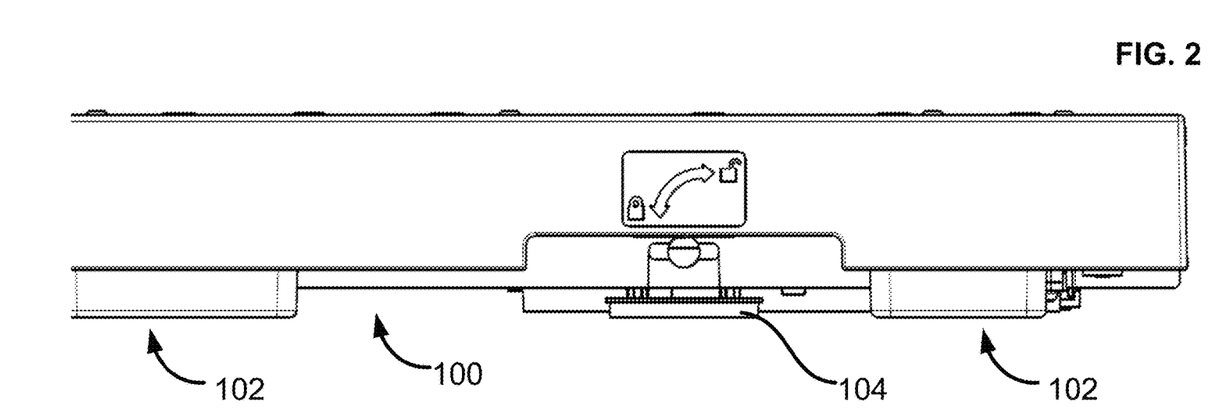
FIG. 2 depicts a base of an embodiment of the present invention.

FIG. 2 depicts an enlarged view of the base 100. Base 100 comprises a bottom section or bottom surface 102 and in the present embodiment two bottom surface sections 102 are depicted. The bottom surface 102 may also be referred to as the underside 102 of the base 100. As will be understood, the bottom surface 102 is adapted to contact the surface 20 when the base 10 is placed on the surface 20. The base 100 also comprises a section 104 that is movable from a retracted position to an extended position. Section 104 may also be referred to as foot section 104 or simply as foot 104.

Figure 3:
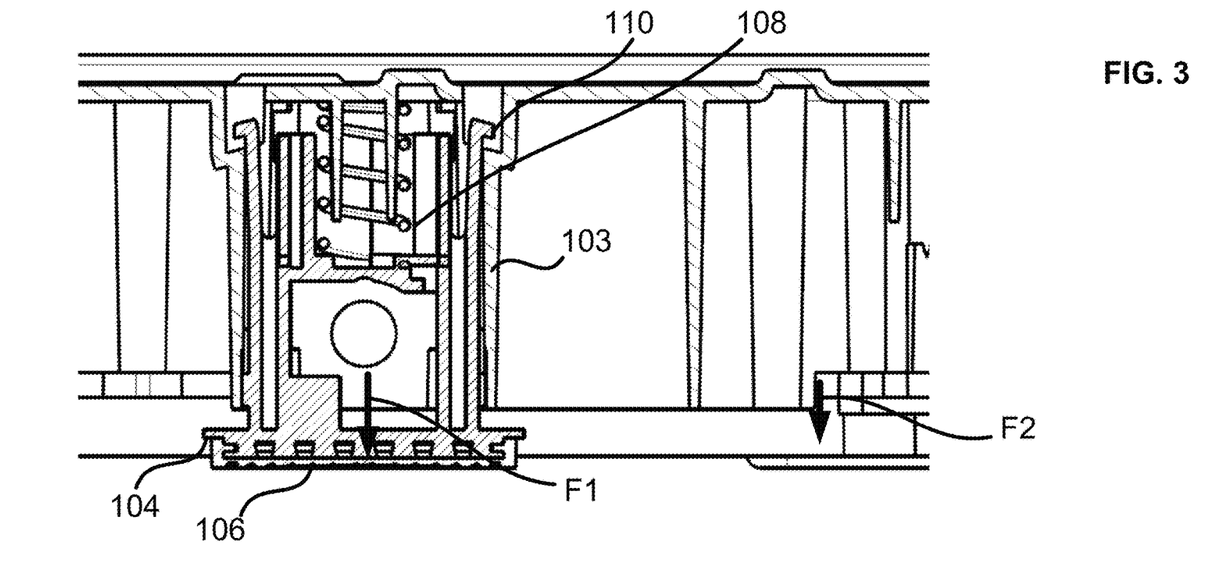
FIG. 3 depicts a cross sectional view of the base of FIG. 2 in a first state.
Figure 5:
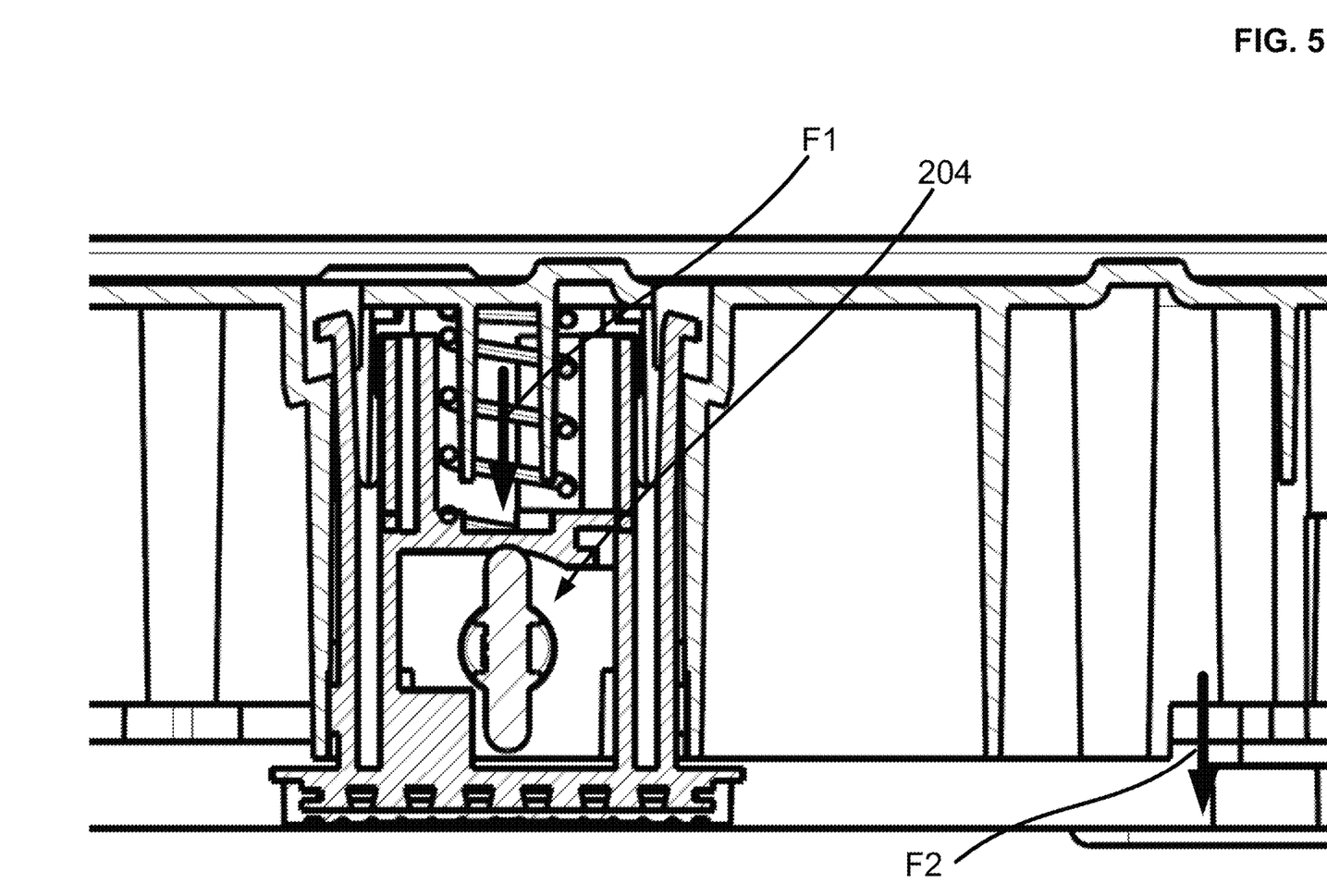
FIG. 5 depicts a cross sectional view of the base of FIG. 2 in a second state.

Further details of the movable section 104 are depicted in FIG. 3. The movable section comprises an end section 106, which end section 106 comprises a material with a high friction coefficient. As will be understood, the end section 106 is adapted to contact the surface 20 when the base 100 is in use. More particularly, when the movable section 104 is in the extended position (as depicted in FIG. 3), the end section 106 contacts the surface 20 (which is a flat surface), and, when the movable section 104 is in the retracted position (as depicted in FIG. 5), the end section 106 does not contact the surface 20. It will be appreciated that the overall friction of the base 100 on the surface 20 will be higher when the movable section 104 is in the extended position. Thus, by means of extending/retracting the movable section 104, one may adjust the friction and switch from a sliding configuration (i.e., a configuration with a lower overall friction) to a fixed configuration (i.e., a configuration with a higher overall friction).

As is depicted in FIG. 3, the base 100 also comprises a forcing element, that, in the depicted embodiment is realized as a spring element 108, which may be realized as a compression spring 108. The spring element 108 urges the end section 106 towards the surface 20, i.e., towards the extended position, with a force identified as F1 in FIG. 3. As will further be understood, the base 100 (and any element placed on the base 100) will also exert a weight force F2. In the embodiment depicted in FIG. 3, the base 100 also comprises a snapping hook 110 adapted to snap into a respective shoulder element.

More particularly, the movable section 104, which may be a high friction or adherent housing foot 104, may be guided in a linear manner in the base 100 of the laboratory analysis device 100 and can move up and down in the direction of the urging or spring force F1. It is provided on the underside with an end section 106, which may be formed of an elastomer which may fixedly connected by means of two-component injection molding processes and has a high coefficient of friction. Furthermore, as discussed, it is secured by means of snap-in hooks 110 against falling out. The compression spring 108 presses the housing foot 104 downwards against the laboratory bench surface 20 with the defined spring force, so that the laboratory analysis device is slip-resistant (=adherent state). It will be understood that the weight of the laboratory analysis device F2 acts on the slidable underside 102 and preferably not on the movable section 104 (e.g., the housing foot). Typically, the spring force F1 may be less than the force F2 due to the weight of the laboratory analysis device 10, so that the device 10 is not pressed upwards undesirably by the spring element or spring means 108.

Figure 4:
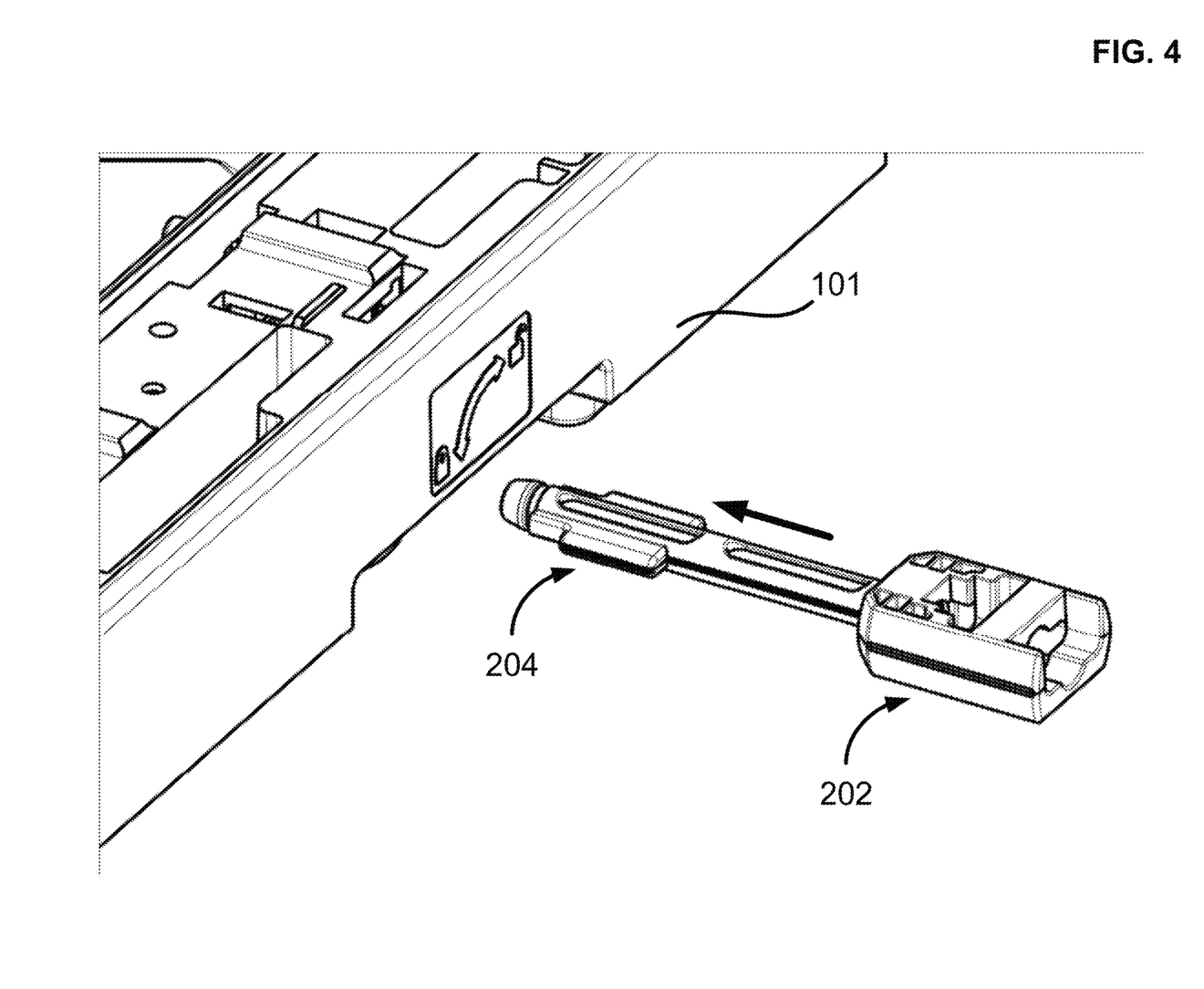
FIG. 4 depicts an actuation mechanism employed in embodiments of the present invention.

As explained, by means of the described movable or extendable section 104, it is possible to alter the friction the base 100 has on the surface 20. In particular, one may switch from a "locked" or "high-friction" state where the section 104 contacts the surface 20 to an "unlocked" or "low-friction" state where the section 104 does not contact the surface 20. That is, by switching between the extended and retracted state of the section 104, one may switch from a "sliding state" to a "locked state" and vice versa. To switch from one state to another, the base 100 may comprise an actuation mechanism as depicted in FIG. 4. In the depicted embodiment, the actuation mechanism comprises a key 202, which may comprise a key bit 204. As will be understood, the base 100 may comprise a lock and the key may be connected to the lock. By turning the key 202, when the key 202 is connected to the lock, one may switch between the different states described above.

According to one embodiment, the key is disconnectable from the base 100 when the base 100 is in the "locked", "high-friction" or "non-sliding state", but not disconnectable from the base 100 when the base 100 is in the "unlocked", "low-friction" or "sliding state". This may serve as a safety measure to clearly indicate to the user when the base 100 is in the latter state, such that it is not inadvertently left in the "unlocked" state.

This is also depicted in FIGS. 3 and 5: In the locked state of FIG. 3, the key 202 is not connected to the base 100 and in the unlocked state of FIG. 5, the key 202 with key bit 204 is connected to the base 100.

With reference to FIG. 4 again, the actuation mechanism or operating element in the form of a key 202 may be attached to the laboratory analysis device 10 and more particularly to the base 100. The key 202 can be inserted from the side 101 into the base 100 and in some embodiments into the housing foot 104. Subsequently the key 202 may be rotated by 90°, so that the housing foot 104 is moved upwards by the key bit 204 against the compression spring 108. The spring force F1 now acts on the key 202 (also see FIG. 5) and the housing foot 104 (or, more generally, the movable section 104) no longer touches the laboratory bench 20, so that the laboratory analysis device 10 can now be shifted manually (=slidable state). Due to the rotation, the key 202 may be simultaneously secured against withdrawal. In this way the key 202 remains the laboratory analysis device 10 so long as the device 20 is in the slidable state. The key 202 may be additionally colored with a signal color in order to make the slidable state clearly discernible for the user. At any time the laboratory analysis device 10 can be returned to the adherent state by turning the key 202 back and removing it again.

While in the above, a particular embodiment of the present invention was described, it should be understood that this embodiment is merely exemplary and should not be construed to limit the invention. To the contrary, it is possible to alter some of the discussed features without departing from the scope of the invention.

For example, while in the above, the present invention has been described with reference to laboratory analysis device, it will be understood that the present invention may also be employed in other devices which stand on a working bench or a counter and cannot be lifted by one person alone in a user-friendly manner, for example, heavy tools such as, for example, box column drills, etc. and also heavy domestic appliances such as, for example, fully automatic coffee machines, etc. Furthermore, the invention is also not limited to instruments and objects that stand on a working bench or a counter, but may also be used in objects stand on the floor and for which the design standards do not provide any fixed and swivel castors, for example, appliances such as, for example, washing machines, etc. and furniture such as, for example, wardrobes, etc.

Furthermore, it will be understood that the spring element or spring means 108 can have a different configuration from that described above. The movable section 104 (also referred to as the adherent foot 104) can also, for example, be pivoted out and in about an axis of rotation by means of a leg spring. In this way no linear guiding of the housing foot 104 is necessary. Actuation is likewise conceivable by means of a rotating traversing movement (screwing movement). In addition to the compression spring described in the practical application, other spring elements such as leaf springs, flexible springs or torsion springs can also be used.

The actuation or operating elements (e.g., the key 202) can have a different configuration from that described above. This can be, for example, integrated fixedly in the device and can be present in the form of a mechanical lever, switch or rotary knob. The actuation moves the housing foot 104 according to the described principle into or out of the device 10, and more particularly, in an out of the base 100. In this case, after transfer into the slidable state, the lever, switch or rotary knob may project very visibly out of the device 10 and more particularly out of base 100. The operating elements can actuate the mechanism either on each housing foot individually or also centrally.

Furthermore, the movement of the moveable section 104 (e.g., the housing foot) may also be provided by another means than a lever, etc. For example, a pneumatic or hydraulic system may be used. Furthermore, the pressing force F1 (designated as the spring force F1 above) could also be produced hydraulically, instead of by a spring means, and could be regulated precisely.

Furthermore, the actuation of the mechanism can also take place exclusively by means of a tool (for example, an Allen key) in order to make unintended access difficult.

The production process may be further simplified (and the costs reduced) by forming the spring means 108 not as a bent wire part but likewise as an integrated injection molded part.

All these modifications are possible without departing from the scope of the invention.

Illustrative Example

In the illustrative example, a base 100 as described above was used. The base 100 had a bottom section 102 formed of polyamide and two movable sections 104, each having an end section 106 formed of a thermoplastic elastomer. The end sections 104 were each urged towards the extended position by means of a spring, respectively. The base 100 had an overall weight of approximately 4 kg and an additional element of 5 kg was placed on top of the base 100 (such that the complete setup had a weight of approximately 9 kg). This setup (with the base 100 and the additional element) was placed on a working bench (constituting the surface 20), which working bench had a coating of a melamine resin.

The setup was then pulled by using a force meter and it was monitored at which force the setup started to move. It will be understood that this force corresponds to the static friction the setup has. When the setup was in the "sliding state", i.e., when the movable section 106 was in the retracted position, the set up started to move at a pulling force of 9 N, roughly corresponding to an overall coefficient of static friction of the overall setup of 0.1, as the overall weight force of 9 kg is approximately 90 N.

When the setup was in the "non-sliding" state, i.e., when the movable section 106 was in the extended position, the set up starting to move at a pulling force of 50 N, roughly corresponding to an overall coefficient of static friction of the overall setup of 0.55 (i.e., 50 N/90 N).

It will thus be understood that this illustrative example, as well as the invention as such, provide a user-friendly, robust and fail safe opportunity of switching a device from a sliding state to a non-sliding state.

Whenever a relative term, such as "about", "substantially" or "approximately" is used in this specification, such a term should also be construed to also include the exact term. That is, e.g., "substantially straight" should be construed to also include "(exactly) straight".

Whenever steps were recited in the above or also in the appended claims, it should be noted that the order in which the steps are recited in this text may be accidental. That is, unless otherwise specified or unless clear to the skilled person, the order in which steps are recited may be accidental. That is, when the present document states, e.g., that a method comprises steps (A) and (B), this does not necessarily mean that step (A) precedes step (B), but it is also possible that step (A) is performed (at least partly) simultaneously with step (B) or that step (B) precedes step (A).

Furthermore, when a step (X) is said to precede another step (Z), this does not imply that there is no step between steps (X) and (Z). That is, step (X) preceding step (Z) encompasses the situation that step (X) is performed directly before step (Z), but also the situation that (X) is performed before one or more steps (Y1), . . . , followed by step (Z). Corresponding considerations apply when terms like "after" or "before" are used.

While in the above, a preferred embodiment has been described with reference to the accompanying drawings, the skilled person will understand that this embodiment was provided for illustrative purpose only and should by no means be construed to limit the scope of the present invention, which is defined by the claims.

What is claimed is:

1. A base for a laboratory analysis device, the base comprising:
    a slidable underside adapted to contact a flat surface when the base is located on the flat surface that slides along the flat surface when the base is pushed along the flat surface;
    a base section, the base section extending upwardly from an open bottom;
    a movable foot received within the base section and adapted to have a retracted position and an extended position, wherein, in the retracted position, the movable foot is positioned relatively upward within the base section and does not contact the flat surface when the base is located on the flat surface, and, in the extended position, the movable foot positioned relatively downward within the base section and contacts the flat surface when the base is located on the flat surface to resist sliding along the flat surface, wherein the movable toot is adapted not to extend further than a plane defined by the slidable underside,
    an actuation mechanism comprising a disconnectabie section that is connectable to and disconnectable from the base, wherein the movable foot is adapted to switch from the extended position to the retracted position when actuated by the disconnectable section,
    wherein the disconnectable section is adapted to have a first position when the movable foot is in the retracted position, and a second position when the movable toot is in the extended position,
    wherein the first and second positions of the disconnectable section are different from one another,
    wherein the disconnectable section is disconnectable from the base when the movable foot is in the extended position, but not disconnectable from the base when the movable foot is in the retracted position.

2. The base according to claim 1, wherein the movable foot comprises:
    an end section adapted to contact the flat surface in the extended position, wherein the end section has a coefficient of static friction that is higher than a coefficient of static friction of the slidable underside.

3. The base according to claim 1, in which the movable foot comprises an adherent foot.

4. The base according to claim 1, wherein the slidable underside includes a plurality of bottom surface sections adapted to contact the flat surface when the base is located on the flat surface.

5. The base according to claim 1, wherein the disconnectable section extends through a side of the base.

6. The base according to claim 1, wherein the disconnectable section comprises a key.

7. The base according to claim 2 further comprising a forcing element to force the movable foot to the extended position.

8. The base according to claim 7, wherein the forcing element comprises a spring.

9. The base according to claim 2, wherein the end section comprises an elastomer and is connected to the movable foot by a two component injection molding.

10. A laboratory analysis device comprising a base, the base including:
- a slidable underside adapted to contact a flat surface when the base is located on the flat surface that slides along the flat surface when the base is pushed along the flat surface;
- a base section, the base section extending upwardly from an open bottom;
- a movable foot received within the base section and adapted to have a retracted position and an extended position, wherein, in the retracted position, the movable foot is positioned relatively upward within the base section and does not contact the flat surface when the base is located on the flat surface, and, in the extended position, the movable foot positioned relatively downward within the base section and contacts the flat surface when the base is located on the flat surface to resist sliding along the flat surface, wherein the movable foot is adapted not to extend further than a plane defined by the slidable underside,
- an actuation mechanism comprising a disconnectable section that is connectable to and disconnectable from the base, wherein the movable foot is adapted to switch from the extended position to the retracted position when actuated by the disconnectable section,
- wherein the disconnectable section is adapted to have a first position when the movable foot is in the retracted position, and a second position when the movable foot is in the extended position,
- wherein the first and second positions of the disconnectable section are different from one another,
- wherein the disconnectable section is disconnectable from the base when the movable foot is in the extended position, but not disconnectable from the base when the movable foot is in the retracted position.

11. The laboratory analysis device according to claim 10, wherein the movable foot comprises:
- an end section adapted to contact the flat surface in the extended position, wherein the end section has a coefficient of static friction that is higher than a coefficient of static friction of the slidable underside,
- wherein the base further comprises a forcing element to force the movable foot to the extended position,
- wherein the forcing element is adapted to force the movable foot to the extended position with a force (F1), wherein the force (F1) is smaller than a weight force (F2) of the laboratory analysis device.

12. The laboratory analysis device according to claim 11, wherein the forcing element comprises a spring.

13. The laboratory analysis device according to claim 11, wherein the disconnectable section extends through a side of the base.

14. The laboratory analysis device according to claim 11, wherein the end section comprises an elastomer and is connected to the movable foot by a two component injection molding.

15. The laboratory analysis device according to claim 10, wherein the disconnectable section comprises a key.

16. A method of locating and sliding a laboratory analysis device, the laboratory analysis device comprising a base, the base including:
- a slidable underside adapted to contact a flat surface when the base is located on the flat surface that slides along the flat surface when the base is pushed along the flat surface;
- a base section, the base section extending upwardly from an open bottom;
- a movable foot received within the base section and adapted to have a retracted position and an extended position, wherein, in the retracted position, the movable foot is positioned relatively upward within the base section and does not contact the flat surface when the base is located on the flat surface, and, in the extended position, the movable foot positioned relatively downward within the base section and contacts the flat surface when the base is located on the flat surface to resist sliding along the flat surface, wherein the movable foot is adapted not to extend further than a plane defined by the slidable underside;
- an actuation mechanism comprising a disconnectable section that is connectable to and disconnectable from the base, wherein the movable foot is adapted to switch from the extended position to the retracted position when actuated by the disconnectable section,
- wherein the disconnectable section is adapted to have a first position when the movable foot is in the retracted position, and a second position when the movable foot is in the extended position,
- wherein the first and second positions of the disconnectable section are different from one another,
- wherein the disconnectable section is disconnectable from the base when the movable foot is in the extended position, but not disconnectable from the base when the movable foot is in the retracted position;

the method comprising:
- locating the base on the flat surface;
- sliding the base on the flat surface while the movable foot is in the retracted position and does not contact the flat surface; and
- moving the movable foot with the actuation mechanism from the retracted to the extended position where the movable foot contacts the flat surface.

17. The method according to claim 16, wherein a coefficient of static friction of the base when the movable foot is in the extended position exceeds a coefficient of static friction of the base when the movable foot is in the retracted position.

* * * * *

UNITED STATES PATENT AND TRADEMARK OFFICE
CERTIFICATE OF CORRECTION

PATENT NO. : 11,129,475 B2
APPLICATION NO. : 15/831670
DATED : September 28, 2021
INVENTOR(S) : Andreas Unger et al.

It is certified that error appears in the above-identified patent and that said Letters Patent is hereby corrected as shown below:

In the Claims

Claim 1, Column 16, Line 33/34:
Replace "wherein the movable toot is"
With --wherein the movable foot is--

Claim 1, Column 16, Line 36:
Replace "a disconnectabie"
With --a disconnectable--

Claim 1, Column 16, Line 43:
Replace "the movable toot"
With --the movable foot--

Claim 10, Column 17, Line 31:
Replace "disconnectabie"
With --disconnectable--

Claim 16, Column 18, Line 31:
Replace "diseormectable"
With --disconnectable--

Claim 16, Column 18, Line 52:
Replace "the fiat surface"
With --the flat surface--

Signed and Sealed this
Nineteenth Day of April, 2022

Katherine Kelly Vidal
*Director of the United States Patent and Trademark Office*